United States Patent
Santi et al.

(10) Patent No.: US 10,303,913 B2
(45) Date of Patent: May 28, 2019

(54) VIRTUAL WAVE DECODER FOR BLURRED IMAGES AND SUBPIXEL PERFORMANCE

(71) Applicant: Datalogic IP Tech S.r.l., Calderara Di Reno, Bologna (IT)

(72) Inventors: Stefano Santi, Bologna (IT); Francesco Deppieri, Bologna (IT); Rinaldo Zocca, Bologna (IT)

(73) Assignee: Datalogic IP Tech S.R.L., Calderara di Reno, Bologna (IT)

( * ) Notice: Subject to any disclaimer, the term of this patent is extended or adjusted under 35 U.S.C. 154(b) by 107 days.

(21) Appl. No.: 15/393,132

(22) Filed: Dec. 28, 2016

(65) Prior Publication Data
US 2018/0181781 A1    Jun. 28, 2018

(51) Int. Cl.
*G06K 7/14* (2006.01)
*G06K 7/10* (2006.01)

(52) U.S. Cl.
CPC ....... *G06K 7/1465* (2013.01); *G06K 7/10722* (2013.01)

(58) Field of Classification Search
CPC ........ G06K 7/10; G06K 7/14; G06K 7/10801; G06K 7/10831; G06K 7/10851; G06K 7/1408; G06K 7/1465
See application file for complete search history.

(56) References Cited

U.S. PATENT DOCUMENTS

| 8,733,650 B1 * | 5/2014 | Segal .................. A63B 53/0466 235/437 |
| 2012/0104100 A1 * | 5/2012 | Gallo .................. G06K 7/10712 235/462.27 |
| 2012/0256001 A1 | 10/2012 | Deppieri et al. |

* cited by examiner

*Primary Examiner* — Laura A Gudorf
(74) *Attorney, Agent, or Firm* — Dentons US LLP

(57) ABSTRACT

A system and method for processing imaged machine readable indicia may include capturing an image of a machine readable indicia including multiple codewords. A determination of an actual scanline of a codeword of the captured indicia may be made. A virtual scanline of the codeword of the imaged indicia for a type of symbology may be generated. In response to the virtual and actual scanlines matching, data representative of the codeword may be stored. Otherwise, repeat generating virtual scanlines of the codewords and compare the generated virtual scanlines with the actual scanlines until a match is identified or possible virtual codewords are exhausted. In response to a match, data representative of the matched scanline may be stored. The process may further repeatedly determine, generate, and compare until each codeword is determined. Data represented by the indicia based on the stored data representative of the matched codewords may be generated.

20 Claims, 13 Drawing Sheets

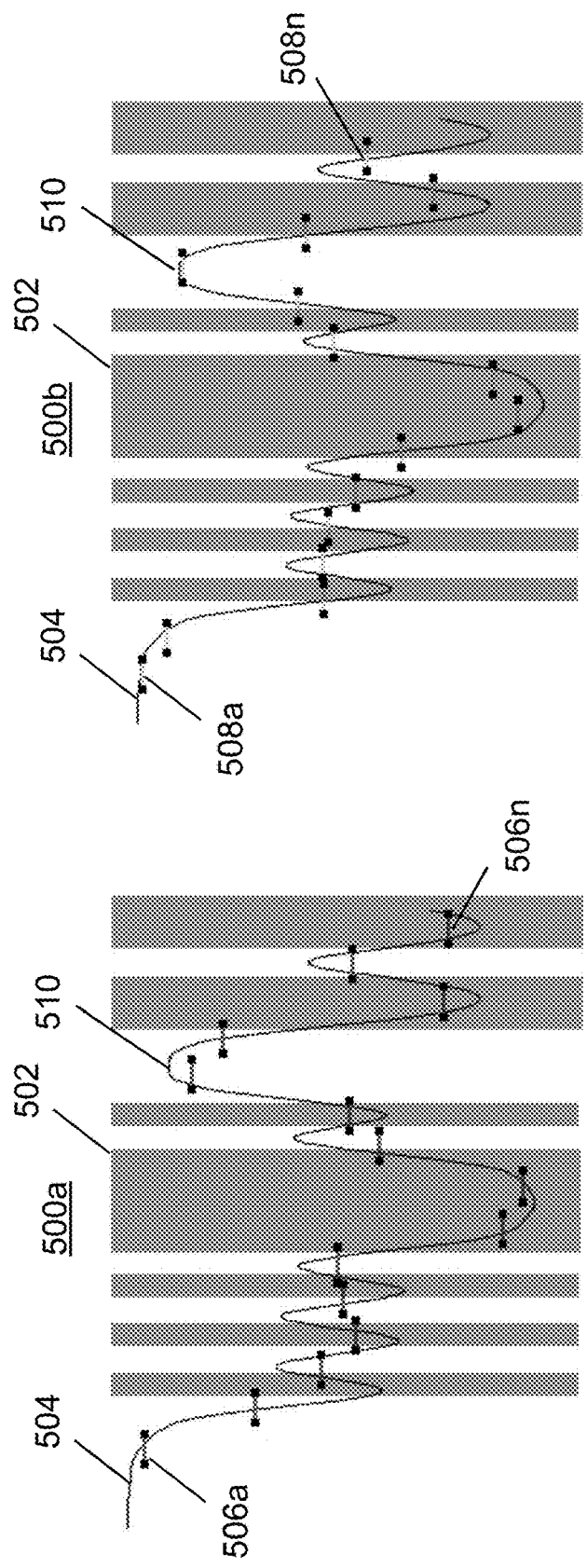

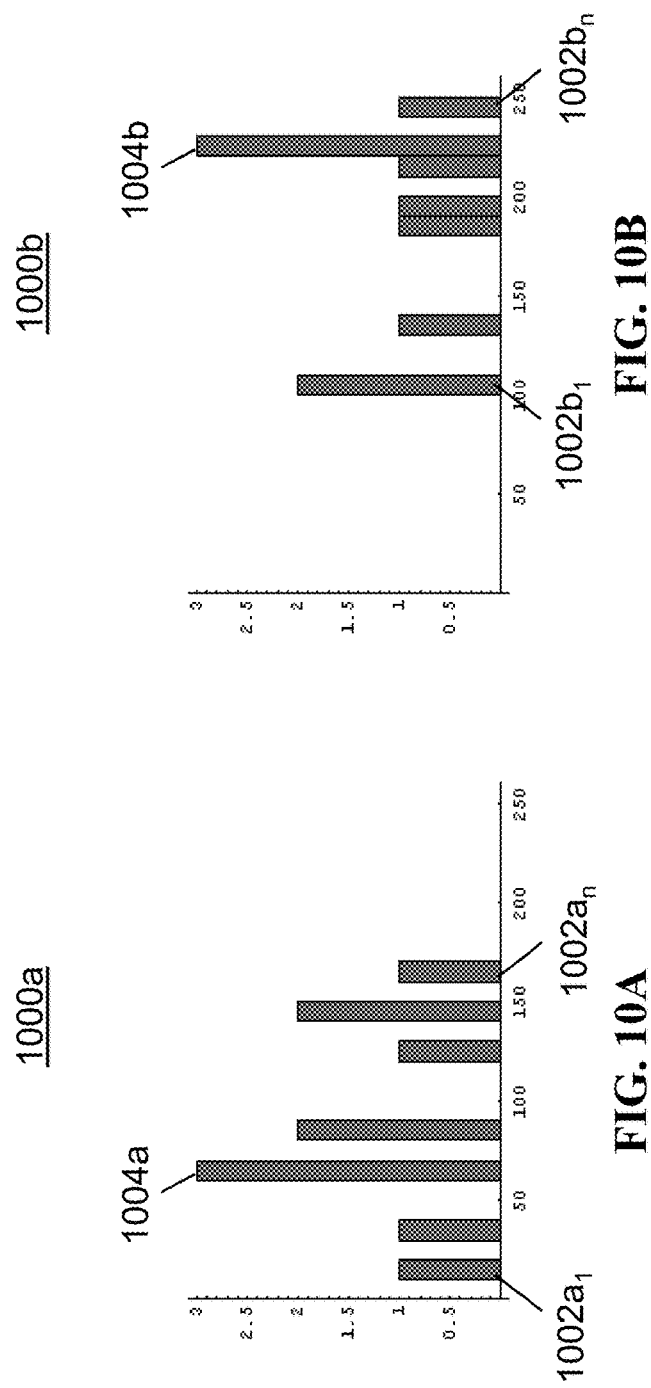

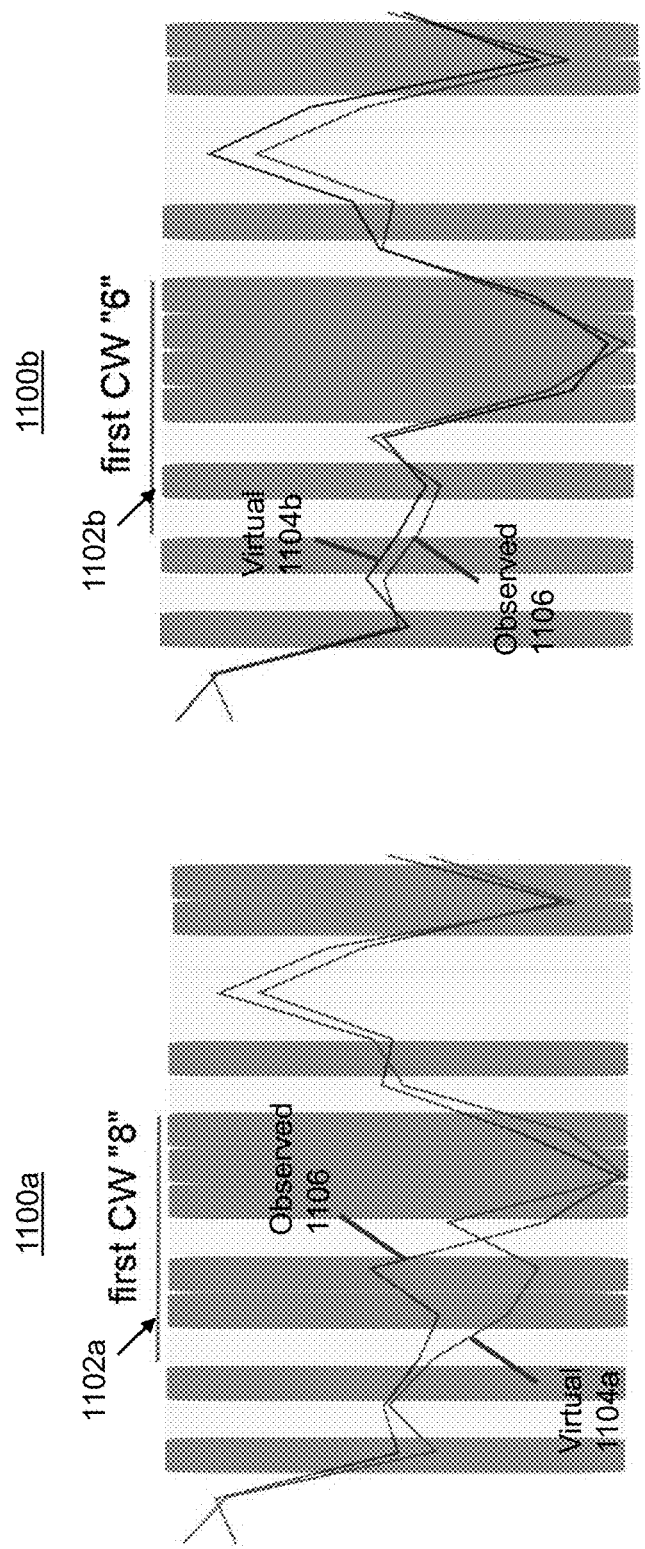

VIRTUAL WAVE DECODER FOR BLURRED IMAGES AND SUBPIXEL PERFORMANCE

BACKGROUND

The use of machine readable indicia scanners, such as barcode scanners, is pervasive throughout a number of industries, including retail and logistics (e.g., shipping of parcels and packages). In most barcode applications, for example retail and packaging, the barcode symbols, either 1-dimensional (1D) or 2-dimensional (2D) labels, are black elements printed over a white backgrounds (or white elements over a black background).

Conventional image or signal processing of barcodes and other machine readable indicia (e.g., QR codes) utilize edge detection or pixel value interpolations with linear filtering to identify a scanline of a scanner. The use of these image processing technologies is effective where the indicia are well visible or at least recoverable through the use of linear filtering. However, in cases where any of (i) an excess of noise, lack of signal, or combination thereof exists in acquired image frames, (ii) too high resolution of symbols (e.g., lines in a barcode being narrowly spaced) for a given image sensor with lower resolution occurs, or (iii) blur being intrinsic in optic design of a camera lens, but may be controlled balancing other optical design parameters, conventional image processing of captured images degrades or simply does not work.

To improve the ability to read machine readable indicia under any individual or combination of the above cases, improved optical and/or processing may be employed. However, improved optical and/or signal processing are often constrained by optical system cost and physical limitations, which always limit performance of the optical system.

SUMMARY

To improve the ability to read machine readable indicia in the event of (i) excess of noise, (ii) resolution of symbols being too high for a given image sensor, and/or (iii) blur in the optic design of a camera lens, image processing of machine readable indicia using an algorithm that takes advantage of knowledge about optical system parameters may be utilized. More specifically, a process that maintains a scanline signal unaltered (e.g., greyscale values across the pixels of an image sensor) and compares the scanline with virtual waves (estimated scanline) generated according both to a known optical transfer function and to a typical barcode structure (i.e., a sequence of black and white elements) may be utilized.

As an example, the imaging system may (i) generate a virtual wave or scanline for a symbol of a given barcode type (e.g., EAN/UPC, Code 128, etc.) being imaged by a scanner with known optical parameters, and (ii) compare the virtual waves or scanline with an actual scanline of a symbol imaged by the scanner. The estimated scanline may be varied over multiple phases and/or other variable imaging parameters so that phase, which may result in a wide range of scanline variation, may be accounted for during the comparison process. As a first example, multiple scanlines may be created for each codeword of a barcode (e.g., each codeword being a set of seven symbols) being decoded for a given barcode image, and a comparison using correlation may be used to compare the virtual scanline and actual imaged scanline. As a second example, multiple scanlines may be merged into one or more pixel sets for one or more codeword of a barcode being decoded for a given barcode image, and a comparison using correlation may be used to compare the virtual scanline and actual imaged scanline. The virtual scanlines may be calculated real-time based on various imaging parameters such that the imaging system is dynamic in nature.

One embodiment of a machine readable indicia scanner may include an image sensor, a non-transitory memory unit configured to store data, such as calibration data and captured image data. A processing unit may be in communication with the image sensor and non-transitory memory, and be configured to capture an image of a machine readable indicia including a plurality of codewords by said image sensor. An actual scanline of a codeword of the machine readable indicia captured by said image sensor may be determined. A virtual scanline of the codeword of the imaged machine readable indicia for a type of symbology may be generated. A comparison between the virtual and actual scanlines of the codeword of the machine readable indicia may be made. In response to determining that the virtual and actual scanlines of the codeword of the machine readable indicia match, data representative of the codeword may be stored in the memory unit. Otherwise, in response to determining that the virtual and actual scanlines of the codeword of the machine readable indicia do not match, repeat generating virtual scanlines of the codewords of the machine readable indicia and comparing the generated virtual scanlines with the actual scanlines until a match is identified or possible virtual codewords are exhausted. In response to matching a virtual scanline with the actual scanline, data representative of the matched scanlines may be stored in the memory unit. The processing unit may repeatedly determine, generate, and compare until each of the codewords are determined and stored. Data represented by the machine readable indicia based on the stored data representative of the matched scanlines may be generated.

One embodiment of a method for processing imaged machine readable indicia may include capturing an image of a machine readable indicia including multiple codewords. A determination of an actual scanline of a codeword of the captured machine readable indicia may be made. A virtual scanline of the codeword of the imaged machine readable indicia for a type of symbology may be generated. A comparison of the virtual and actual scanlines of the codeword of the machine readable indicia may be made. In response to determining that the virtual and actual scanlines of the codeword of the machine readable indicia match, data representative of the codeword may be stored. In response to determining that the virtual and actual scanlines of the codeword of the machine readable indicia do not match, repeat generating virtual scanlines of the codewords of the machine readable indicia and comparing the generated virtual scanlines with the actual scanlines until a match is identified or possible virtual codewords are exhausted. In response to matching a virtual scanline with the actual scanline, data representative of the matched scanline may be stored. The process may further repeatedly determine, generate, and compare until each of the codewords are determined and stored. Data represented by the machine readable indicia based on the stored data representative of the matched codewords may be generated.

BRIEF DESCRIPTION OF THE DRAWINGS

Illustrative embodiments of the present invention are described in detail below with reference to the attached drawing figures, which are incorporated by reference herein and wherein:

FIGS. 5A and 5B are graphs inclusive of illustrative captured and sampled image data;

FIGS. 10A and 10B are histograms shown to include EAN8 (100%) local minima values and EAN8 local maxima values;

FIGS. 11A and 11B are images of a captured barcode; and

DETAILED DESCRIPTION OF THE DRAWINGS

A machine readable indicia scanner including a decoding algorithm that supports decoding ability of machine readable indicia in cases where a traditional decoding approach based on signal processing of a scanline fails due to blurriness or other image processing problems is described herein. In an embodiment, a scanline signal generated by the scanner from an imaged machine readable indicia may remain unaltered, and a comparison to virtual waves or scanline generated based on both a known optical transfer function of the scanner and typical machine readable indicia (e.g., barcode) structure (i.e., sequence of black and white elements) may be performed to decode the imaged machine readable indicia.

Figure 1A:
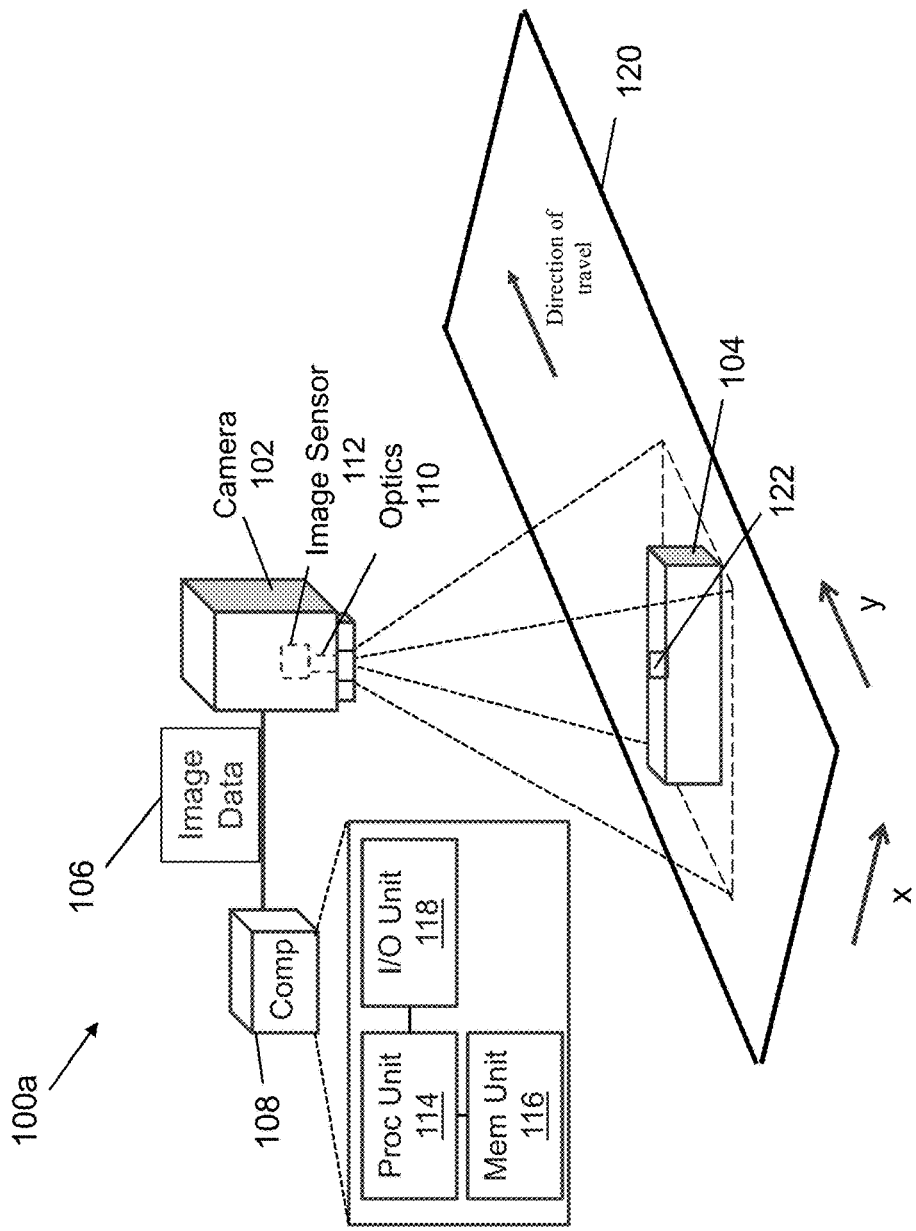
FIG. 1A is an illustration of an illustrative machine readable indicia scanner for use in scanning machine readable indicia, such as barcodes, QR codes, or other machine readable indicia.

With regard to FIG. 1A, an illustration of an illustrative machine readable indicia scanner 100a for use in scanning machine readable indicia, such as barcodes, QR codes, or other machine readable indicia, is shown. The scanner 100a may be configured to operate as a product inspection system or logistics processing system. The scanner 100a may include a camera 102 configured to capture images of an object 104 and generate image data 106. The camera 102 may include optics 110, which may include lens(es), window, optical filter(s), and so on, and an image sensor 112 may be used. In an embodiment, the image data 106 captured by the camera 102 may be communicated to a computer system 108 for processing thereby. Alternatively, the camera 102 may be configured to process the image data 106. In an embodiment, the camera 102 and computer system 108 may be formed as a single unit. Although the system 100 shows a single camera 102, multiple cameras may be utilized to capture images from similar or different angles.

A processing unit 114 external from the camera 102 may include a single processor or multiple processors. The processing unit 114 may further include suitable logic, circuitry, and interfaces that are operable to execute one or more instructions based on sensor and other data received to perform operations of the scanner 100a. The processing unit 114 may be realized through a number of processor technologies known in the art. The examples of the processing unit 114 may include, but are not limited to, an x86 processor, an ARM processor, a Reduced Instruction Set Computing (RISC) processor, an Application-Specific Integrated Circuit (ASIC) processor, an image processor, a digital signal processor, or a Complex Instruction Set Computing (CISC) processor. The support circuits for the processing unit 114 may include a memory unit 116 and input/output (I/O) unit 118 for communicating data, such as the image data 106, with the camera 102 or over a communications network (e.g., the Internet, wireless communications network, and so on).

As shown, the object 104 is positioned on a conveyer belt 120 that operates to move the object 104 along a direction of travel of the conveyer belt 120. When the camera 102 images the object 104, the optics 110 and image sensor 112 may have some level of blur in the image, thereby being problematic for conventional image processing, as previously described. Depending on height of the object 104, speed of the conveyer belt 120, resolution of a machine readable indicia 122 associated with, in this case attached to, the object 104, illumination of the indicia 122, optical noise, and so on may also contribute to difficulty in reading or decoding the indicia 122 by conventional image processing techniques. As a result, the processing unit 114 may be configured to utilize an algorithm that generates a virtual scanline based on system parameters and machine readable indicia type to be able to more accurately determine or decode codewords of the machine readable indicia.

Figure 1B:
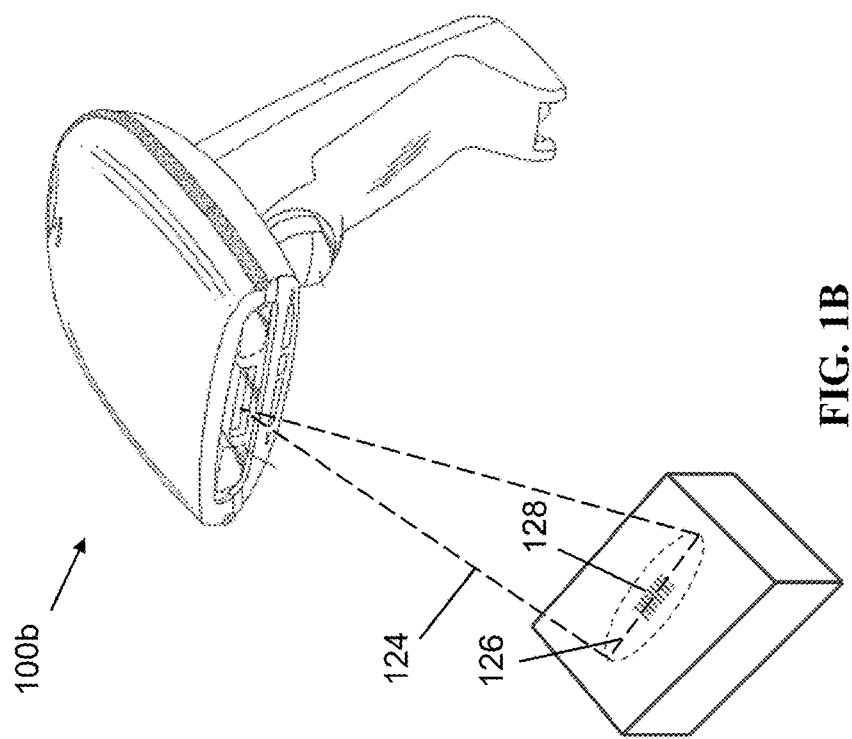
FIG. 1B is an illustration of an illustrative handheld barcode scanner that may be configured to operate in the same or similar manner as the scanner of FIG. 1A.

With regard to FIG. 1B, an illustration of an illustrative handheld barcode scanner 100b that may be configured to operate in the same or similar manner as the scanner 100a of FIG. 1A is shown. For example, the handheld scanner 100b may be configured with a processing unit (not shown) within or external from the scanner 100b, and execute software that performs the same or similar indicia decoding functions as described hereinbelow. It should be understood, however, that different optical configuration and performance may exist with the scanners 100a and 100b, so an optical transfer function used in computing a virtual scanline may be different for the two scanners 100a and 100b. As shown, the handheld scanner 100b may be configured to capture within an image region 124, and a linear or 1D scanline 126 that extends across a machine readable indicia 128, in this case a barcode, may be used to read codewords defined by lines and widths thereof of the indicia 128.

An image formation process on an image sensor may be used within an algorithm for processing images by a machine readable indicia scanner, as shown in FIGS. 1A and 1B, as further described herein. The image formation process described below is limited to a 1D case for simplicity purposes, but it should be understood that the same or similar mathematical model is valid for a 2D process with some additional mathematical computation, as will be understood by one of skill in the art.

Figure 2:
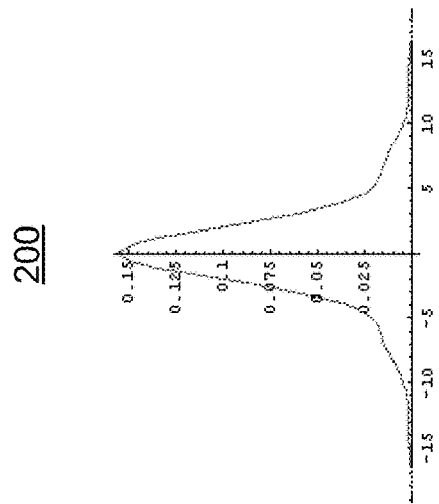
FIG. 2 is a graph showing a function h(x) defined as a normalized point spread function of an optical system of a scanner.

With regard to FIG. 2, a graph showing a function h(x) defined as a normalized point spread function 200 of an optical system of a scanner, where x is a space coordinate (given, for example, in μm), is shown. As shown, the normalized point spread function h(x) 200 (unity integral) of an illustrative scanner optic with pixels between 3 μm and 6 μm is represented at a distance of 500 mm from the scanner. The x-axis is given in μm. The normalized point spread function h(x) operates as a low-pass filter.

Figure 3:
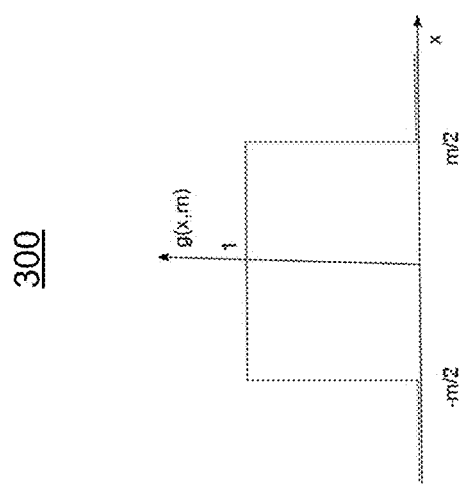
FIG. 3 is a graph showing a modelled illumination response of a highest resolution element based on a characteristic function.

With regard to FIG. 3, a graph showing a modelled illumination response of a highest resolution element based on a characteristic function is shown. Assuming that a barcode symbol is printed black over a white background (this is not a limitation since the dual case may be treated in the same way), the highest resolution element on the barcode symbol may be defined as g(x,m), which is the black module of size m (i.e., module size) centered around the origin, $$g(x, m) = X_{[-\frac{m}{2}, \frac{m}{2}]}(x),$$

where $X_{[a,b]}(\cdot)$ is considered a characteristic function 300 defined by an interval within square brackets.

An ideal normalized analog light profile k(x,m) imaged on an image sensor due to the highest resolution element on the barcode symbol g(x,m) (e.g., a white module subject on a black background image) may be calculated as:

$$k(x, m) = g(x, m) * h(x) = \int_{-m/2}^{m/2} h(x - y) dy$$

Figure 4:
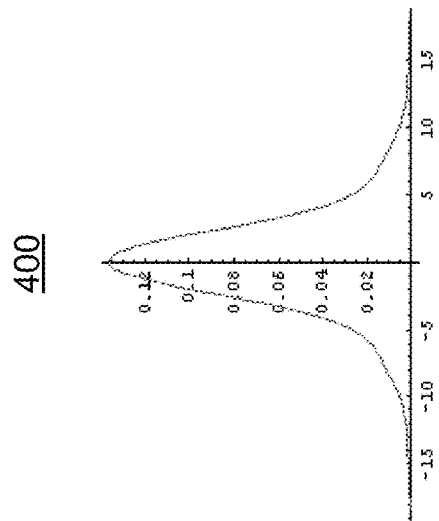
FIG. 4 is a graph that shows an illustrative analog light profile k(x,m) of an illustrative optical configuration of a scanner.

As an example, FIG. 4 is a graph that shows an illustrative analog light profile k(x,m) 400 of an illustrative optical configuration of a scanner at 500 mm from the scanner when an element 4 μm large is imaged on the sensor since the sensor pixel is 6 μm, nearly 0.66 pixel per module. The x-axis is given in μm. The analog light profile 400 is a result of a linear convolution of the point spread function h(x) 100 and characteristic function g(x,m) 200 both being optical filter, and may be stored in a lookup table to increase speed of operation of determining virtual scanlines, as further described herein.

Since the barcode is ideally an N long sequence of black and white intervals (dependent on the module m) whose widths are collected in the sequence M(i,m), the ideal analog light profile b(x,m,L) on the image sensor due to the barcode in the image is:

$$b(x, m, L) = \qquad (1)$$
$$W(x) - (W(x) - B) \sum_{i=1}^{N} \left( \frac{1 + (-1)^{i-1}}{2} \right) \cdot k(x - O(i), M(i, m))$$

where white level W(x) is generally a function of position, while black level B is usually a constant. Equation (1) models a barcode, and describes an analog signal presented in side the optic within the scanner. In an embodiment, the ideal analog light profile b(x,m,L) may be computed real-time during scanning.

A value of the quantity within round brackets in the summation is either 1 if the interval is black (i is odd) or 0 if the interval is white (i is even). The function O(i) in equation (1) is the offset in the space coordinate of the center of i-th interval, either black or white, and depends on M(i,m) through the following relation:

$$O(i) = \frac{M(i, m)}{2} + \sum_{k=1}^{i-1} M(k, m)$$

Note that a factor (1/2) has been introduced in order to start a first bar of a barcode at the origin. If alternative machine readable indicia is being scanned, alternative factors may be utilized to align a first symbol.

A digital image that is input to a decoding library is the result of an accumulation of an analog light profile on single pixels areas followed by an analog-to-digital conversion (ADC). Since quantization noise due to ADC is usually well below pixel noise, this model neglects quantization noise while concentrating on the charge accumulation of the pixel. As provided in equation (2), pixel values $p_i$ of a digital image signal may be represented as:

$$p_i = n_i + \int_{\varphi+i\cdot\Delta}^{\varphi+(i+1)\cdot\Delta} b(x, m, L) dx \qquad (2)$$

where Δ is the pixel size, φ is the initial phase between a pixel grid and barcode signal, and $n_i$ is additive white noise.

In an embodiment, data may be permanently stored as lookup tables representing optical characterization of the scanner at different distances, the initial phase, and any quantity used to compute equation (2). Alternatively, the lookup tables may be hard-coded if an optical spread across different units is small. In an embodiment, a fast memory unit may be configured to store image pixel data (i.e., pixel values of each frame) or image sensor data are usually stored in fast non-permanent memory such as SDRAM, DDR2, DDR3 etc.

As an example, FIGS. 5A and 5B are graphs inclusive of illustrative captured and sampled image data 500a and 500b, where a real barcode image 502 is shown in transparent grey on which two different modelled scanlines 504a and 504b generated using the pixel values $p_i$ model of equation (2) with different respective phases $\varphi_1$ and $\varphi_2$. The scanlines 504a and 504b represent the first two codewords of an EAN8 label encoding "64509723," where a kernel used is the kernel used for the illustrative barcode scanner previously described at 500 mm, and the pixel size of 6 μm is representative of an illustrative image sensor. The horizontal bars 506a-506n (collectively 506) and 508a-508n (collectively 508) represent an interval of integration of a pixel, while level of the horizontal bars represent the pixel value. More specifically, the horizontal bars 506 and 508 are modelled values with two different starting phases, and represent a grayscale level of the pixels of the analog signal integrated within the pixel boundaries. The scanlines 504a and 504b are also modelled, and represent an ideal barcode signal of equation (1).

The barcode in the example is translated into sequence M(k,m) of equation (1), and is M(k,m)={m,m,m,m,m,m,4m, m,m,3m,2m,m,2m . . . }.

Dependency on phase for measurements is particularly evident in values close to a highest peak 510, where the energy is shared by two adjacent pixels, as shown in FIG. 5A, while the energy is accumulated by only one pixel (with a higher value than the two adjacent pixels), as shown in FIG. 5B. As a result, grey level of the pixels is different for the first scan than the second scan due to the different initial phases $\varphi_1$ and $\varphi_2$ between the pixel grid and barcode signal of the two scans.

In an embodiment, a decoding algorithm may be based on an attempt to reverse an image formation process of a scanner so as to determine an original sequence of black and white intervals of a scanned barcode by generating a virtual scanline signal that best fits a captured scanline (i.e., a sequence of image sensor pixel values resulting from imaging a barcode or other machine readable indicia). Contrary to conventional image processing algorithms for scanners, the captured scanline data is not modified in any way by filtering operations, but rather the captured scanline data is used for comparison purposes against the virtual scanline.

An assumption for the proposed algorithm to work is knowledge of the normalized point spread function h(x), which allows calculating the ideal normalized analog light profile k(x,m) for all the values of the module m.

In an embodiment, h(x) and k(x,m) functions may be stored in a non-transitory memory in a set of lookup tables. The h(x) and k(x,m) functions represent an accurate calibration of the optical system of the scanner, and may be determined during production of the scanner. The ability to effectively use the functions in memory as lookup tables may be accomplished by knowledge of scanning distance. The scanning distance may be known by conventional image analysis (e.g., by looking for a pattern, such as a laser cross) or with some other heuristic on an illumination of an object. In an embodiment, the transfer function may be computed at run-time without relying on optical calibration data, but rather relying on other heuristic technique. A "brute force" approach may be used in cases when the distance is unknown (e.g., multiple functions may be used for a single decode attempt).

A high-level embodiment of a process for determining a machine readable indicia may include the following steps:
1. Code localization and formal verification;
2. Symbology exclusion;
3. Code Identification and parameter calculation; and
4. Virtual signal best fit.

Each of the steps are described in detail hereinbelow along with an example to illustrate each of the steps.

The example is based on image captured by an illustrative scanner, such as a scanner inclusive of a 2D sensor. The machine readable indicia is an EAN8 (100%) barcode with content "64509723" placed at 500 mm from the scanner with an illumination of 300 lux. As will be recognized by one of skill in the art, this test case is well beyond current decoding limits of conventional image processing of scanners.

1. Code Localization and Formal Verification: As provided herein, a simple computation may be performed while preventing the computational effort of next steps in cases where no labels are present in the image.

In this step, the code is localized based on signal activity between two areas where signal dynamics are weak, generally known as quiet zones. A further formal verification may utilize cross correlation analysis among different scanlines (subsequent frames for a 1D sensor or adjacent lines for a 2D sensor). The verification may be done either by considering (i) location and strength of peaks, or (ii) position and strength of edges. A last operation of this step may be an estimation of white W(x) and black level B: the white W(x) may be estimated from the scanline in the quiet zone with possible interpolation, while the black level B may be found using dark pixels (i.e., pixels that are not illuminated with white light of a barcode) of an image sensor.

Figures 6A, 6B:
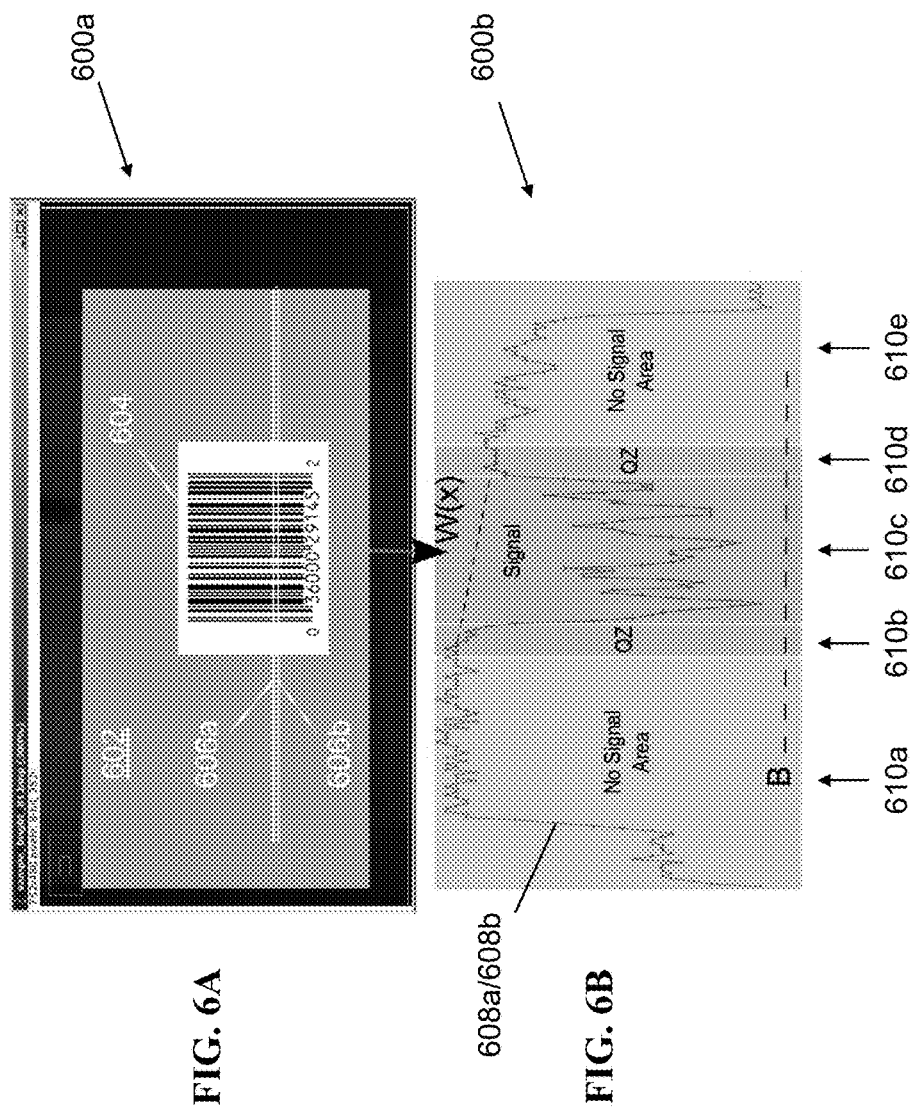
FIG. 6A is an illustration of an illustrative screenshot of an imaged object (e.g., parcel package) on which a barcode is affixed.
FIG. 6B is a graph inclusive of measured adjacent scanlines.

With regard to FIG. 6A, an illustration of an illustrative screenshot 600a of an imaged object (e.g., parcel package) 602 on which a barcode 604 is affixed is shown. Two linear adjacent scanlines 606a and 606b are shown to cross the object 602 and barcode 604. With regard to FIG. 6B, a graph 600b inclusive of measured adjacent scanlines 608a and 608b (collectively 608) are shown. The measured scanlines 608 are created as a result of reading pixel levels of an image sensor of the imaged object 602 and barcode 604 along a linear path of the scanlines 606a and 606b. As shown in the graph 600b, there are a number of different regions, including a "no signal area" 610a, quiet zone 610b, "activity area" 610c, quiet zone 610d, and "no signal area" 610e that physically correspond with the object 602 and regions on the barcode 604. The possible signal candidate may be identified in the "activity area" 610c between the quiet zones 610b and 610d. The white W(x) and the black levels B are also shown on the respective top and bottom of the graph 600b.

Figure 6C:
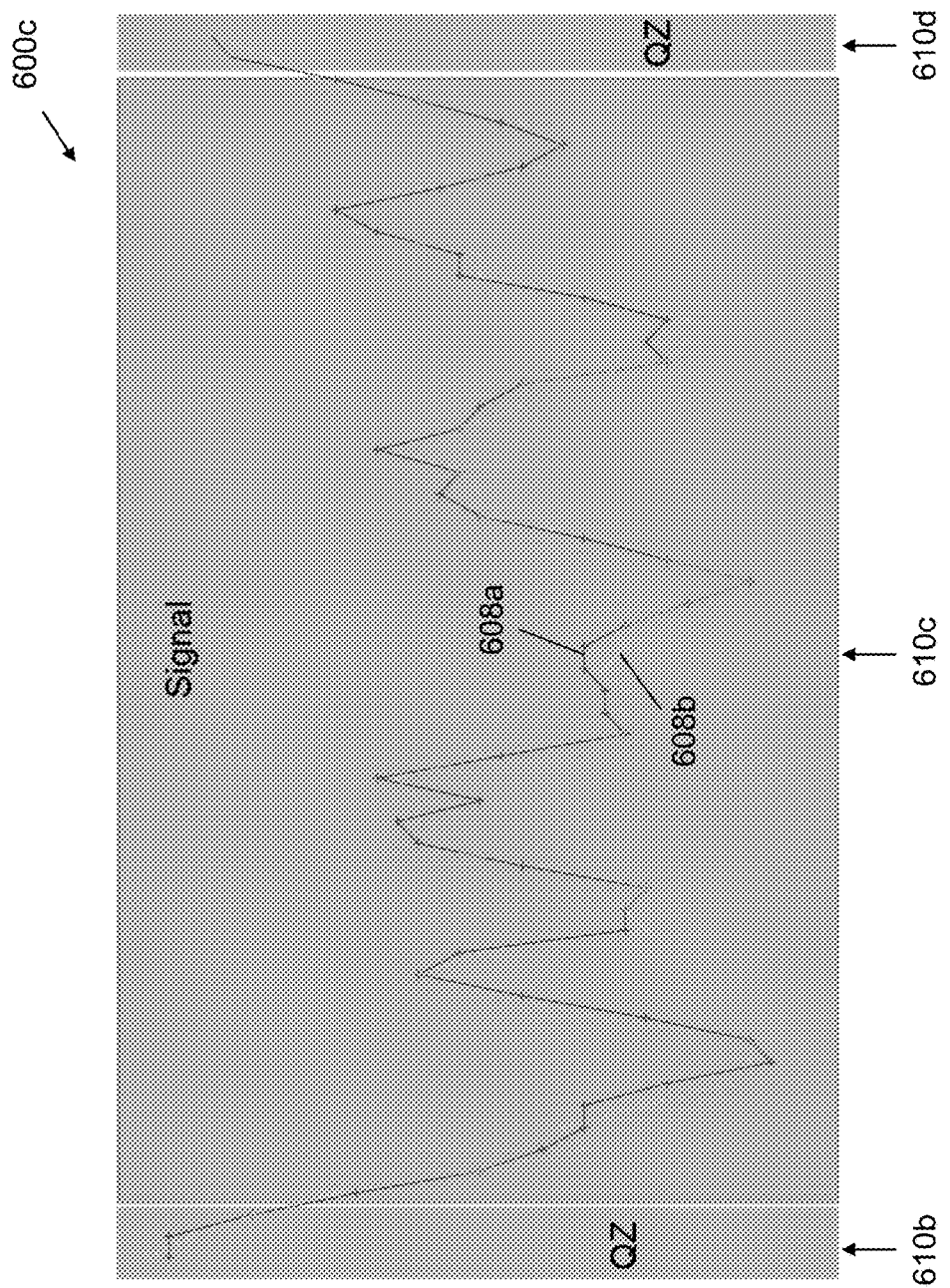
FIG. 6C is a zoomed-in graph inclusive of the quiet zones and "activity area" that are shown along with the measured scanlines.

With regard to FIG. 6C, a zoomed-in graph 600c inclusive of the quiet zones 610b and 610d and "activity area" 610c that are shown along with the measured scanlines 608a and 608b. The measured scanlines 608a and 608b are shown to be correlated, which provides a first validation criteria of the label inclusive of the barcode 604. The two adjacent captured scanlines 606 that are used to capture the same code 604 provide a high degree of correlation may verify the scan.

Figure 7A:
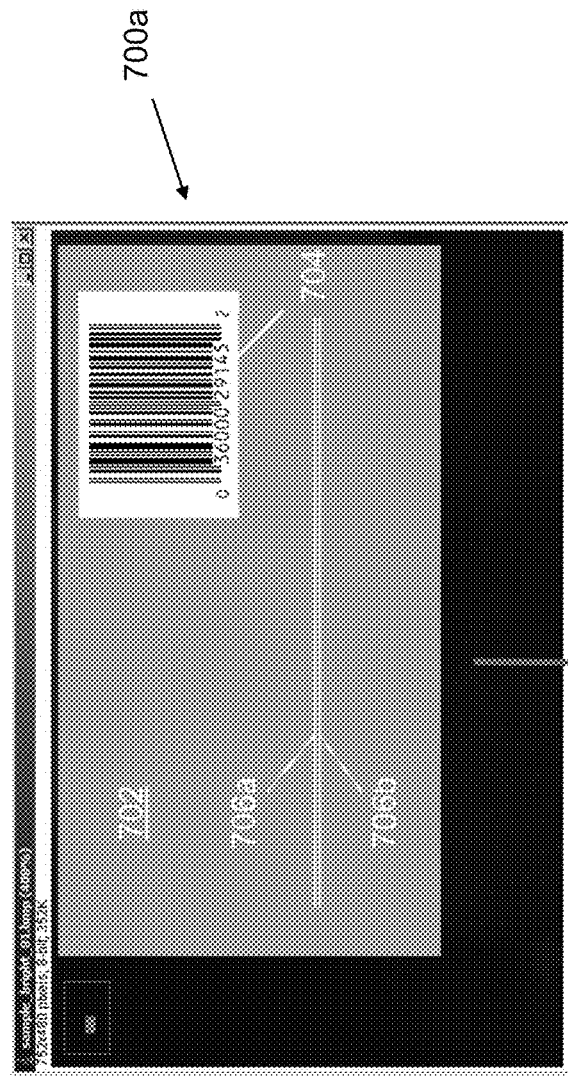
FIG. 7A is an illustration of an illustrative screenshot of an imaged object on which a barcode is affixed.
Figure 7B:
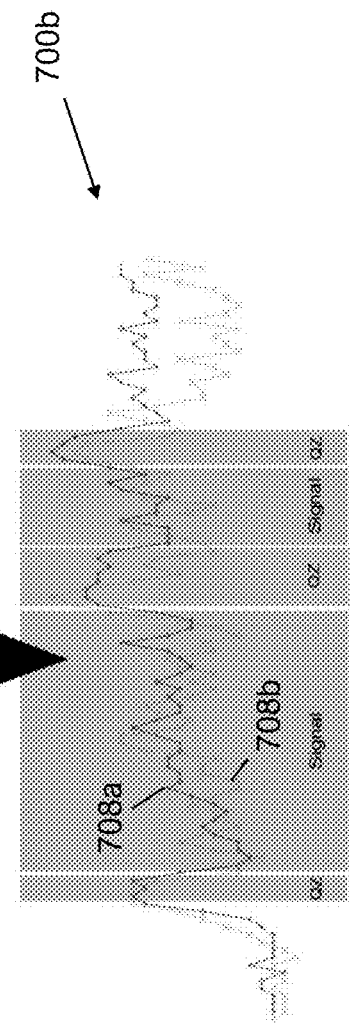
FIG. 7B is a graph inclusive of measured adjacent scanlines.

With regard to FIG. 7A, an illustration of an illustrative screenshot 700a of an imaged object 702 on which a barcode 704 is affixed is shown. Two linear adjacent scanlines 706a and 706b are shown to cross the object 702, but not the barcode 704. With regard to FIG. 7B, a graph 700b inclusive of measured adjacent scanlines 708a and 708b (collectively 708) are shown. The measured scanlines 708 are created as a result of reading pixel levels of an image sensor of the imaged object 702, but not the barcode 704 in this scan, along a linear path of the scanlines 706a and 706b. As a result of imaging the object 702, but not the barcode 704, the correlation check fails because the two measured scanlines 708a and 708b are not correlated. Though the "signal areas" have been identified, the correlation check fails and the decoding process is aborted.

2. Symbology Exclusion: One embodiment may include excluding some symbologies from being processed using a simple analysis of the signal, thereby improving efficiency of the process as a whole. The analysis may include examining symbols or features that are indicative of different types of symbols such that identification of a symbology may be automated.

In this step, some assumptions are taken:

1. The signal is expected to be at least slightly blurred. In an embodiment, the processes described herein address cases where conventional image processing algorithms fail to process barcodes with the limitations previously described, such as blur. And, since a certain amount of blur is likely to be the main cause of failure, blur is not a limiting assumption.

2. The below non-exhaustive list of supported symbologies that the process may recognize through identification of certain features of the symbologies, may include:
   a. Code 39
   b. 2/5 Standard
   c. 2/5 Interleaved
   d. EAN/UPC
   e. Code 128

Though the list is a limiting assumption (i.e., that objects scanned will include symbologies limited to this list), other symbologies may be added to expand this step of the process.

Code structure may be generalized for the symbologies included in the list. In particular, the symbologies may be classified into two or more levels. Such classification enables a process to automatically identify symbology of the above list based on code structure.

In the first case, black and white elements may be either wide or narrow with a certain wide-narrow ratio (WNR). Code 39, 2/5 Standard, and 2/5 Interleaved sybologies belong to this first class.

In the second case, black and white elements have a width that is an integer multiple of a narrowest element that is the module m. EAN/UPC and Code 128 sybologies belong to this second class, and both of the symbologies are 4-level symbologies (i.e., each element is 1, 2, 3, or 4 times the module).

A simple analysis on local extrema of an imaged code signal may be used to classify a candidate barcode in the first or second class. In an embodiment, if values of both local minima and local maxima of the signal are collected and presented in histogram form, an analysis of the histogram distinguishes between the first and second classes. In particular, if both histograms are uni-modal or bimodal with a strong separation between one mode and the other, then a candidate barcode may be determined to belong to the first class. Otherwise, the candidate barcode may be determined to belong to the second class.

If the candidate barcode belongs to the first class, the difference between the values of the two main modes of the local maxima and local minima histograms indicate whether the information is encoded in black elements only (2/5 Standard) or both in black and white elements (Code 39 and 2/5 Interleaved).

If any of the former condition is encountered, the other symbologies may be disabled for the next steps in processing the barcode image signal. For example, if the candidate barcode belongs to the second class, the decoders of the first class may be disabled (i.e., Code 39, Standard 2/5, and 2/5 Interleaved may be disabled).

Figure 8B:
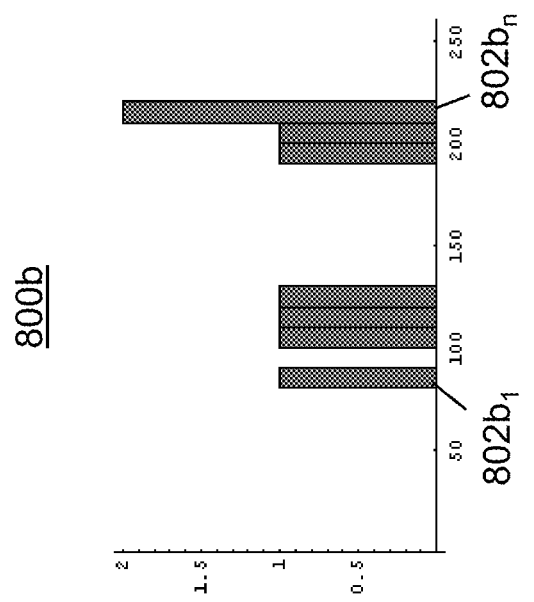
FIGS. 8A and 8B are illustrative histograms that include illustrative Code 39 local minima values and Code 39 local maxima measurement values, respectively, that may be used to distinguish between first and second classes of symbologies.
Figure 8A:
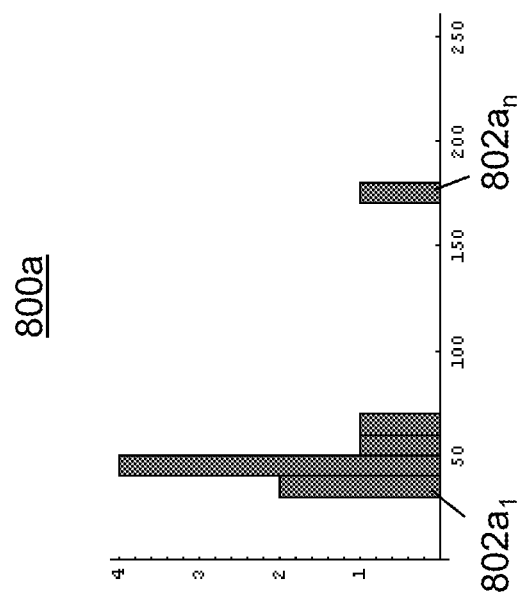

With regard to FIGS. 8A and 8B, illustrative histograms 800a and 800b that include illustrative Code 39 local minima values $802a_1$-$802a_n$ and Code 39 local maxima measurement values $802b_1$-$802b_n$, respectively, that may be used to distinguish between first and second classes of symbologies. In the histograms 800a and 800b, local minima and maxima extrema values of a Code 39 encoding "A1" with m=0.63·Δ and WNR=2.5 are shown.

Figure 9B:
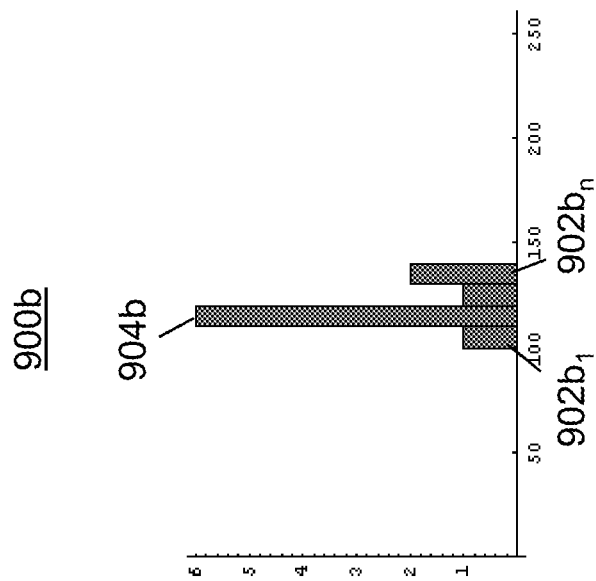
FIGS. 9A and 9B are illustrative histograms that include illustrative 2/5 Standard local minima values and 2/5 Standard local maxima measurement values, respectively, that may be used to distinguish between first and second classes of symbologies.
Figure 9A:
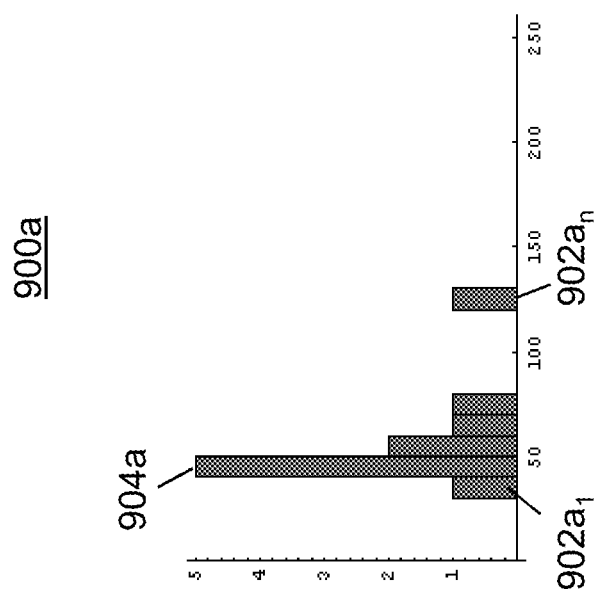

With regard to FIGS. 9A and 9B, illustrative histograms 900a and 900b that include illustrative 2/5 Standard local minima values $902a_1$-$902a_n$ and 2/5 Standard local maxima measurement values $902b_1$-$902b_n$, respectively, that may be used to distinguish between first and second classes of symbologies. In the histograms 900a and 900b, local minima and maxima extrema values of a 2/5 Standard encoding "345" with m=0.63·Δ and WNR=2.5 are shown. As shown, a difference of the location of peaks 904a and 904b is much less than the peaks 804a and 804b in Code 39 of FIGS. 8A and 8B, thereby indicating that the information is limited to the black elements of the barcode (and image sensor pixels).

With regard to FIGS. 10A and 10B, histograms 1000a and 1000b are shown to include EAN8 (100%) local minima values $1000a_1$-$1000a_n$ and EAN8 local maxima values $1000b_1$-$1000b_n$. The minima and maxima local extrema values are representative of content with a value of "64509723," and with m=0.63·Δ.

3. Code Identification and parameter calculation: The main aid of this step is to identify a list of the potential symbologies that may match an observed signal.

In an embodiment, a two sub-step process may be utilized:
   1. Feature extraction
   2. Pattern match on relevant features Feature Extraction Sub-Step: in a region of quiet zones, a feature that may match with a robust finder pattern may be searched. For example, start/stop characters of Code 39 or stop character of Code 128 are robust finder patterns, where a feature extraction sub-step may extract a correct symbology to which the observed signal belongs.

This feature extract sub-step may instead fail for those symbologies that does not have a robust finder pattern, such as the EAN/UPC barcode family. In such cases, the next pattern match sub-step may be more computational intensive, while each of those symbologies remain enabled.

Pattern Match on Relevant Features Sub-Step:

If a robust pattern has been found in the feature extraction sub-step previous phase, a pattern match with invariant scale transformation may be performed to determine a best fit with an observed signal. In this case, the module m and phase φ (and optionally wide/narrow ratio) may be slightly modified around respective rough estimations found in the feature extraction sub-step to generate a virtual scanline that is compared with a measured scanline of an imaged barcode. The combination of those parameters that minimize an error function may be chosen, and an accurate estimation of the black level B may be available as an output of the scale invariant transformation.

If a robust pattern has not been found in the feature extraction sub-step, the same analysis previously described may be based on some simplified assumption, such as a fixed length symbology or some other information that is dependent on symbology. Note that at this point, the process or algorithm is performing a "blind" symbology assumption, and a verification at the end may be made if the initial assumption was correct or not. For example, for EAN/UPC, this pattern match on relevant features sub-step may use information of a fixed number of modules in the code (constant length) and an existence of the syncronism.

In an embodiment, an ink spread estimation may be added to the pattern sub-step. Estimating ink spread makes the process slower, but improves robustness.

The output of the pattern match on relevant features sub-step is both the list of the symbologies that passed each of the previous steps of the process, and an accurate estimation of the following parameters:
  (i) module size m;
  (ii) relative phase between pixels and modules φ;
  (iii) black level on the code B;
  (iv) wide/narrow ratio if applicable R; and
  (v) ink spread (optionally).
  4. Virtual Signal Best Fit: This step is used to produce a sequence of binary values that represent an alternation of bars and spaces of an observed signal. This virtual signal best fit step makes possible the ability to determine information contained in a barcode, while the previous steps establish a parameters for the virtual signal best fit step to work.

In an embodiment, the algorithm may use information collected in previous steps to generate a virtual signal that best fits an observed signal. The virtual signal may be generated according to equation (2) without noise contribution, where an integral part may be stored in a set of lookup tables (function of φ,m,k(x,m)) to gain algorithm efficiency despite memory usage. In an embodiment, to further gain processing efficiency, only sequences M(i,m) that correspond to the codewords of the identified symbologies may be used to generate the virtual signal.

A different virtual signal may be generated for each codeword using the known black and white levels, and an error relative to an observed signal may be calculated. In an embodiment, the virtual signals may be generated in real-time during an imaging and/or reading barcode process.

A virtual signal that is determined to best fit the observed signal codeword-by-codeword (e.g., maintains an error below a certain threshold level (dependent on the noise) for each off the codewords) may be determined to be the decoded label.

More particularly with regard to FIGS. 11A and 11B, images 1100a and 1100b of a captured barcode are shown. In an embodiment, the images 1100a and 1100b have been captured and processed by a particular model barcode scanner that includes a 2D sensor, and the captured barcode is a EAN8 (100%) barcode with content "64509723" placed at 500 mm from the scanner with 300 lux illumination.

In this example, at the beginning of the virtual best fit of step 4, as previously described, the only symbology enabled should be EAN/UPC, which are fixed length. As understood, a module size of an EAN/UPC barcode may be determined by dividing length of the code (measured in pixels) and a number of modules (67 for EAN8, 95 for EAN13). Phase may be determined by comparing center of the pixels with center of each module.

A set of 20 virtual signals, one for every 7 modules long codeword for EAN/UPC symbology, may be generated according to equation (2) without noise contribution. The module of the phase and of the convolution function between module and PSF (normalized analog light profile k(x,m)) are known from previous steps. Since both an EAN13 and an EAN8 decoder may be tried, the process of FIG. 12 may be executed for two decoders, and the EAN13 decoder would fail for having an error that is determined to be too high.

An example about how the comparison step works is shown in FIGS. 11A and 11B, where a first codeword 1102a and 1102b of the EAN8 is determined. As shown, each virtual waveform 1104a and 1104b corresponds to a possible codeword, and is compared with a portion of the observed signal 1106 to which the virtual waveforms 1104a and 1104b are being matched.

The scanline 1106 of the EAN8 code is compared in FIG. 11A with the virtual scanline 1104a whose first codeword is "8." As shown, the observed and virtual scanlines 1106 do not match as an error (difference between the scanlines) is significant.

As shown in FIG. 11B, the observed scanline 1106 compared with virtual scanline 1104b whose first codeword is "6" is shown to match as a result of the virtual scanline 1104b having a minimum error condition in a set of all 20 possible codewords that may be compared to the observed scanline 1106.

While the codeword "8" in FIG. 11A is second best as a result of being different only by a bar-space swap, the matching error with the correct codeword "6" is nearly 4 times less than the error estimated with its nearest neighbour virtual scanline generated with codeword "8".

Figure 12A:
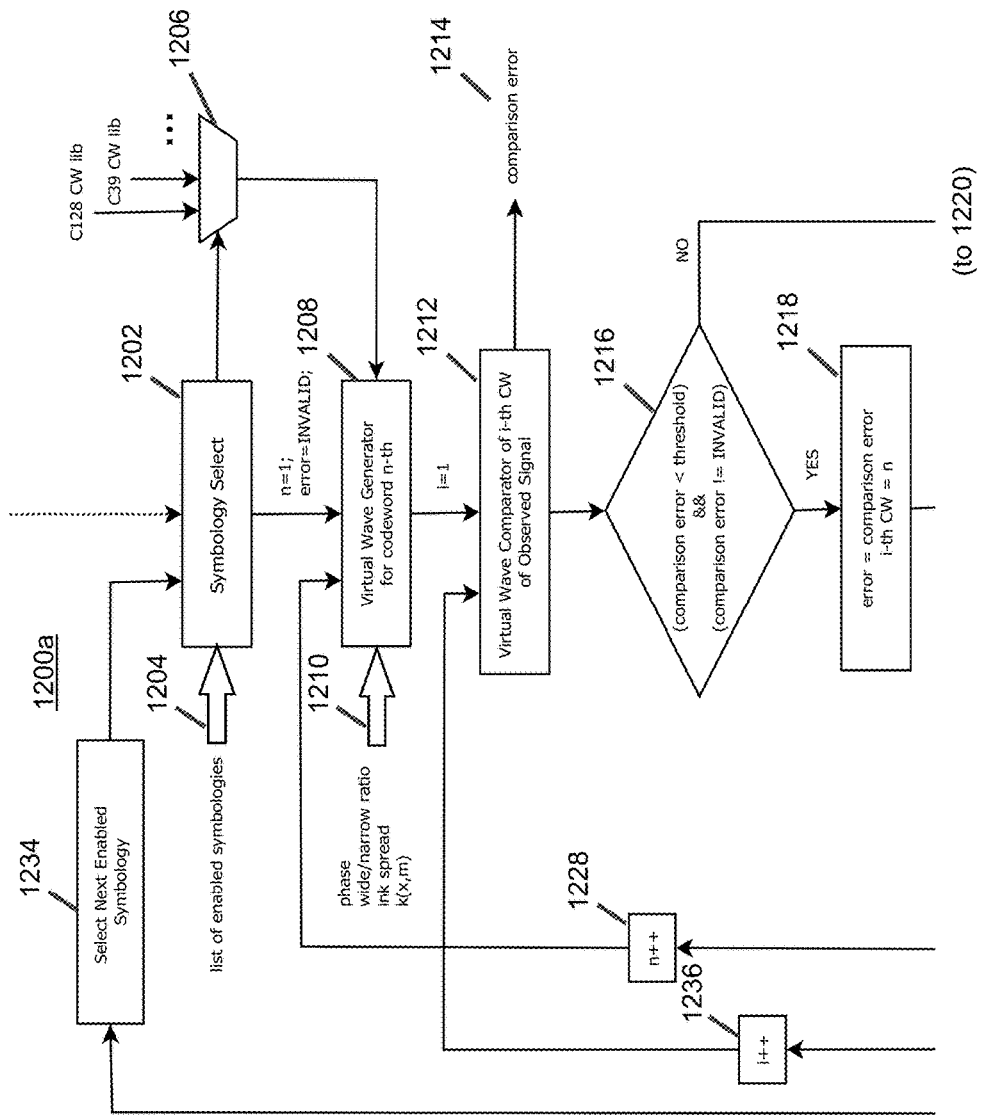
FIGS. 12A and 12B (collectively FIG. 12) is a flow diagram of an illustrative process for decoding a barcode using the principles described herein.
Figure 12B:
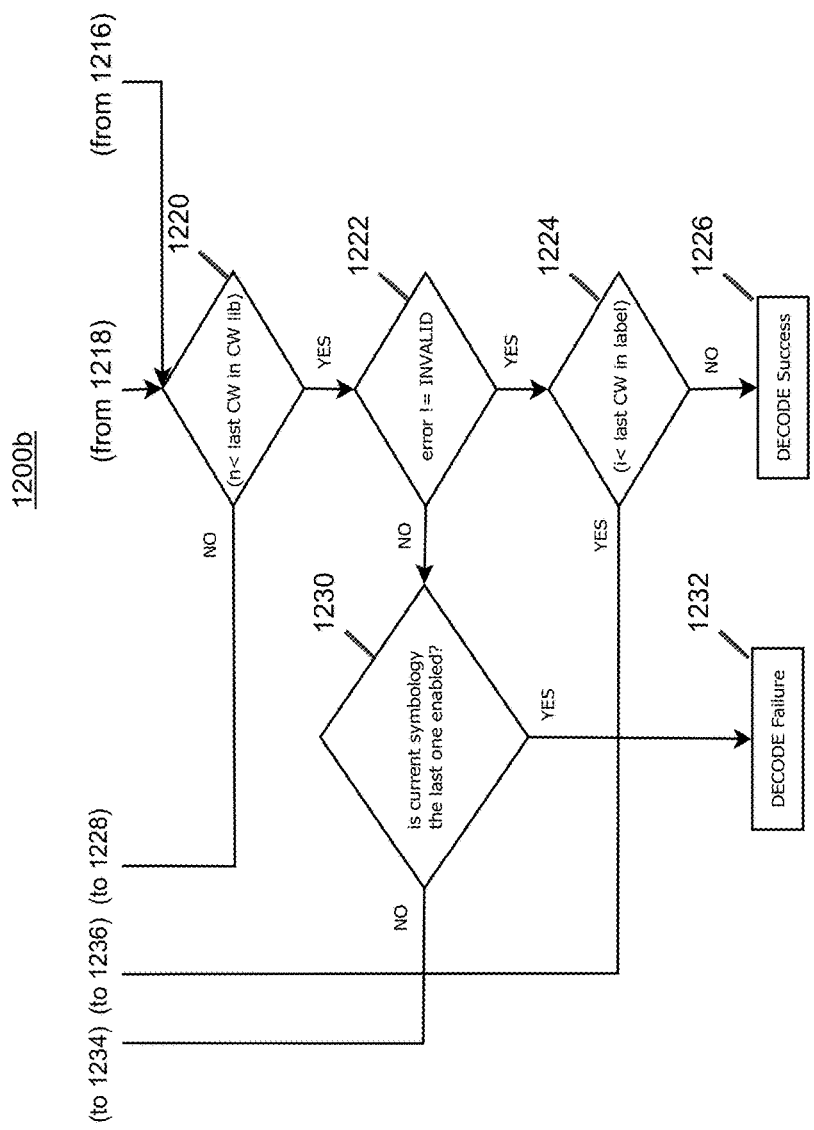

With regard to FIGS. 12A and 12B (collectively FIG. 12), a flow diagram of an illustrative process 1200 for decoding a barcode using the principles described herein is shown. The process 1200 may start at step 1202, where a symbology may be selected. A symbology may include a symbology from multiple available symbologies that the scanner may be configured to scan. A list of symbologies 1204 may be available to be input into the symbology selection step 1202. The list of symbologies may include, for example, Code 39, 2/5 Standard, 2/5 Interleaved, EAN/UPC, and Code 128. It should be understood that additional and/or alternative symbologies may be input into the symbology selection step 1202.

A selected symbology from step 1202 may be input into a library selector step 1206, where the selected symbology may enable a selection of symbology data from a library to be selected and input into step 1208 that is configured to generate a virtual wave for an n-th codeword. The virtual wave generator at step 1208 may be performed in real-time. In an embodiment, at least a portion of generating the virtual wave real-time may include accessing a lookup table, as previously described with regard to equations (1) and (2). The symbology data may include possible codewords for the given symbology. For example, a symbology may include 20 codewords that are possible for any given codeword that may be used by the process 1200 for comparison purposes at step 1208. In addition, the symbology selector step 1202 may input n=1 and that no error exists (i.e., n=INVALID) during initial set up. As previously described, calibration values, which represent optical parameters of a scanner may be stored in a permanent memory in production phase) are used for the computation of the virtual waveform.

At step 1210, a number of parameters used for generating a virtual wave or scanline may be input to the virtual wave generator being performed at step 1208. The parameters may include phase, wide/narrow ratio, ink spread, and normalized analog light profile k(m), for example. At step 1212, a comparison of the virtual scanline and observed scanline or signal may be performed of the $i^{th}$ codeword. For a first codeword of a scanline, the value of i may be set to value of 1 by the virtual wave generator at step 1208. Resulting from the comparison at step 1212, a comparison error 1214 may be produced. The comparison error may be generated using any number of correlation algorithms, as understood in the art, to compare two waveforms (i.e. virtual scanline and observed scanline of a codeword).

At step 1216, a determination may be made as to whether the comparison error is less than a threshold and whether the comparison error is not invalid. If the comparison error is less than the threshold and the comparison error is not invalid, then the process continues at step 1218, where the error is set to the comparison error and the $i^{th}$ codeword is set to n. The process continues at step 1220. Alternatively, if the determination at step 1216 is no (i.e., comparison error is greater than or equal to the threshold or a comparison error exists), then the process continues at step 1220.

At step 1220, a determination is made as to whether n is less than a last codeword in the codeword library (e.g., whether the virtual codeword being compared is the last virtual codeword available to be compared against an observed codeword for a given symbology). If a determination is made that the codeword being compared is not the last codeword in the codeword library, then the process continues at step 1222, where a determination may be made as to whether an error is not invalid. If the error is determined not to be invalid at step 1222, then the process continues at step 1224, where a determination is made as to whether the last codeword in a label or barcode being compared. If except 1224, a determination is made that the codeword being compared is the last codeword in the barcode, then the process continues at step 1226, where a determination is made that the decoding of the barcode was a success.

If, at step 1220, a determination is made that the last codeword being decoded was not the last codeword in the codeword library, then the process continues at step 1228, where the value of n is increased so as to compare the next codeword of the barcode. The process thereafter returns to step 1208 for the virtual scanline generator to generate the next virtual codeword utilizing the various inputs for barcode decoding purposes, as previously described.

If at step 1222, a determination is made that an error has occurred, then the process continues at step 1230, where a determination is made as to whether a current symbology is the last symbology that is enabled. If so, then the process continues at step 1232, where a determination may be made that the coding of the barcode (or other machine readable indicia) has failed. Alternatively, if additional symbologies are enabled, then the process continues at step 1234, where a selection of a next enabled symbology may be made, and the process may return to step 1202, where a symbology may be selected based on a next enabled symbology from the list of enabled symbologies from step 1204.

If a determination is made that the codeword being analysed is not the last codeword in the label or barcode, then the process continues at step 1236, where i is increased so that a next codeword may be compared at step 1212. The process may continue to compare each of the codewords in the barcode until the barcode is fully processed or until an error occurs during comparison of the virtual scanlines of the codewords and observed scanlines of the codewords.

Although the configurations and processes described herein are being related to a machine readable indicia scanner that primarily focuses on scanning and reading barcodes, it should be understood that the principles may alternatively be utilized for scanning and reading other types of codes (e.g., QR codes) and features (e.g., characters, watermarks, text, and so on).

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, Parallel Flash, serial Flash, eMMC and SD Cards, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A machine readable indicia scanner, comprising:
   an image sensor;
   a non-transitory memory unit configured to store data;
   a processing unit in communication with said image sensor and non-transitory memory, and configured to:
      capture an image of a machine readable indicia including a plurality of codewords by said image sensor;
      determine an actual scanline of a codeword of the machine readable indicia captured by said image sensor;
      generate a virtual scanline of the codeword of the imaged machine readable indicia for a type of symbology by using or calculating a transfer function of the scanner using an input of a type of the machine readable indicia being scanned from a known distance;
      compare the virtual and actual scanlines of the codeword of the machine readable indicia;
      in response to determining that the virtual and actual scanlines of the codeword of the machine readable indicia match, store data representative of the codeword in said memory unit,
      otherwise, in response to determining that the virtual and actual scanlines of the codeword of the machine readable indicia do not match,
         repeat generating virtual scanlines of the codewords of the machine readable indicia and comparing the generated virtual scanlines with the actual scanlines until a match is identified or possible virtual codewords are exhausted; and
         in response to matching a virtual scanline with the actual scanline, store data representative of the matched scanlines in said memory unit;
      repeatedly determine, generate, and compare until each of the codewords are determined and stored; and
      generate data represented by the machine readable indicia based on the stored data representative of the matched scanlines.

2. The scanner according to claim 1, wherein the machine readable indicia is a barcode.

3. The scanner according to claim 1, wherein said processing unit, in calculating a transfer function, is further configured to use or calculate a point spread function of an optical path of the scanner convolved with a characterization function based on highest resolution of the machine readable indicia over the known distance from said image sensor.

4. The scanner according to claim 1, wherein said processing unit, in using or calculating a transfer function, is further configured to use or calculate a transfer function multiple times with different phase values.

5. The scanner according to claim 1, wherein said processing unit, in using or calculating a transfer function, is further configured to add white noise data to the calculation.

6. The scanner according to claim 1, wherein said processing unit, in comparing the virtual and actual scanlines of the codeword, is further configured to correlate the scanlines.

7. The scanner according to claim 1, wherein said processing unit is further configured to:
   responsive to determining that possible virtual codewords are exhausted, determine that possible virtual codewords are exhausted for a machine readable indicia type; and
   repeat generating, comparing, storing, and repeating using another symbology.

8. The scanner according to claim 7, wherein said processing unit is further configured to generate a notification signal for a user of the scanner indicative of whether the scanner was successful in decoding the machine readable indicia in response to successfully matching each codeword of the machine readable indicia after all available symbologies have been determined to be unsuccessful in successfully matching each codeword of the machine readable indicia.

9. The scanner according to claim 7, wherein said processing unit is further configured to selecting the symbology and the another symbology from a list of enabled symbologies.

10. A machine-readable indicia scanner, comprising:
    an image sensor;
    a non-transitory memory unit configured to store data;
    a processing unit in communication with said image sensor and non-transitory memory, and configured to:
       capture an image of a machine readable indicia including a plurality of codewords by said image sensor;
       determine an actual scanline of a codeword of the machine readable indicia captured by said image sensor;
       generate a virtual scanline of the codeword of the imaged machine readable indicia for a type of symbology by using or calculating a transfer function of the scanner using an input of a type of the machine readable indicia being scanned from a known distance;
       compare the virtual and actual scanlines of the codeword of the machine readable indicia by correlating the scanlines and determining whether a correlation error is less than a threshold value;
       in response to determining that the virtual and actual scanlines of the codeword of the machine readable indicia match, store data representative of the codeword in said memory unit,
       otherwise, in response to determining that the virtual and actual scanlines of the codeword of the machine readable indicia do not match, repeat generating virtual scanlines of the codewords of the machine readable indicia and comparing the generated virtual scanlines with the actual scanlines until a match is identified or possible virtual codewords are exhausted; and in response to matching a virtual scanline with the actual scanline, store data representative of the matched scanlines in said memory unit;

repeatedly determine, generate, and compare until each of the codewords are determined and stored; and generate data represented by the machine readable indicia based on the stored data representative of the matched scanlines.

11. A method for processing imaged machine readable indicia, comprising:

capturing an image of a machine readable indicia including a plurality of codewords;

determining an actual scanline of a codeword of the captured machine readable indicia;

generating a virtual scanline of the codeword of the imaged machine readable indicia for a type of symbology;

comparing the virtual and actual scanlines of the codeword of the machine readable indicia;

in response to determining that the virtual and actual scanlines of the codeword of the machine readable indicia match, storing data representative of the codeword;

in response to determining that the virtual and actual scanlines of the codeword of the machine readable indicia do not match, repeat generating virtual scanlines of the codewords of the machine readable indicia and comparing the generated virtual scanlines with the actual scanlines until a match is identified or possible virtual codewords are exhausted; and in response to matching a virtual scanline with the actual scanline, storing data representative of the matched scanlines;

repeatedly determining, generating, and comparing until each of the codewords of the captured machine readable indicia are determined and stored;

generating data represented by the machine readable indicia based on the stored data representative of the matched codewords;

responsive to determining that possible virtual codewords are exhausted includes determining that possible virtual codewords are exhausted for a machine readable indicia type; and repeating generating, comparing, storing, and repeating using another symbology.

12. The method according to claim 11, wherein capturing an image of a machine readable indicia includes capturing an image of a barcode.

13. The method according to claim 11, wherein generating a virtual scanline includes using or calculating a transfer function of a scanner capturing the image of the machine readable indicia using an input of a type of the machine readable indicia being scanned from a known distance.

14. The method according to claim 13, wherein using or calculating a transfer function includes using or calculating a point spread function of an optical path of the scanner convolved with a characterization function based on highest resolution of the machine readable indicia over the known distance.

15. The method according to claim 13, wherein using or calculating a transfer function includes calculating a transfer function multiple times with different phase values.

16. The method according to claim 13, wherein using or calculating a transfer function further includes adding white noise data to the calculation.

17. The method according to claim 11, wherein comparing the virtual and actual scanlines of the codeword includes correlating the scanlines.

18. The method according to claim 17, wherein comparing the virtual and actual scanlines includes determining whether a correlation error is less than a threshold value.

19. The method according to claim 11, further comprising generating a notification signal for a user of the scanner indicative of whether the scanner was successful in decoding the machine readable indicia in response to successfully matching each codeword of the machine readable indicia after all available symbologies have been determined to be unsuccessful in successfully matching each codeword of the machine readable indicia.

20. The method according to claim 11, further comprising selecting the symbology and the another symbology from a list of enabled symbologies.

* * * * *